M. LITTLE.
Potato-Digger.
No. 20,949.
Patented July 20, 1858.
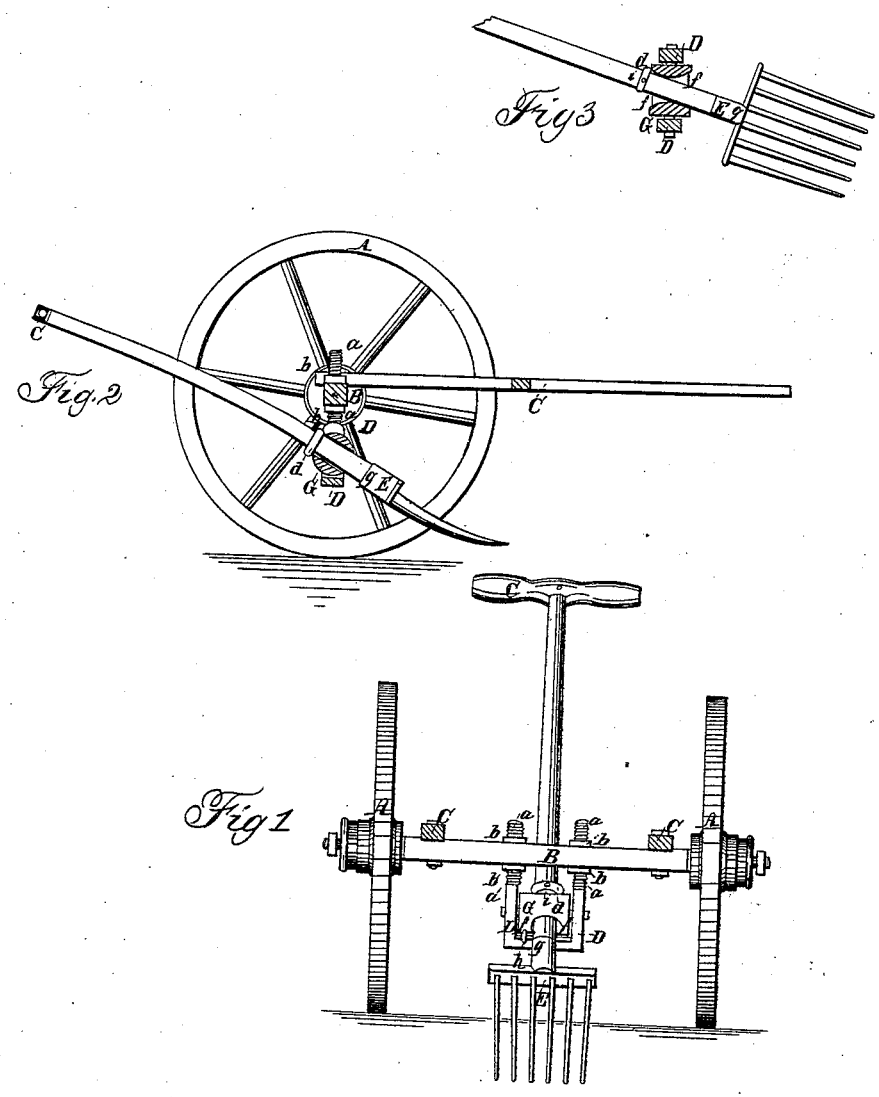

UNITED STATES PATENT OFFICE.

M. LITTLE, OF CLYDE, NEW YORK.

IMPROVEMENT IN MACHINES FOR DIGGING POTATOES.

Specification forming part of Letters Patent No. 20,949, dated July 20, 1858.

*To all whom it may concern:*

Be it known that I, MALCOLM LITTLE, of Clyde, in the county of Wayne and State of New York, have invented a new and Improved Machine or Implement for Digging Potatoes; and I do hereby declare that the following is a full and exact description thereof, reference being had to the accompanying drawings, making part of this specification—

Figure 1 being a front elevation of the machine; Fig. 2, a longitudinal vertical section thereof, except of the fork, in the central plane; Fig. 3, a horizontal section and plan of a part detached.

Like letters designate corresponding parts in all the figures.

The machine is composed essentially of a large strong fork, E, supported and drawn by means of a pair of wheels, A A, axle B, and tongue or shafts C C. The fork is so constructed and arranged that the attendant can manage it in such a manner as to remove the potatoes from the ground with it while it is drawn along, as now to be specified.

Beneath the middle of the axle B is secured a hanger or bearing, D, by means of screw-shanks $a\ a$ and adjusting-nuts $b\ b\ b\ b$, whereby said bearing may be raised or lowered, as occasion may require. This or any equivalent mode of suspension may be employed. In this bearing is mounted a short horizontal roller, G, which is provided with a transverse aperture, through which is inserted the handle of the fork, as represented. The fork turns freely in this aperture, which is enlarged into mouths flaring horizontally, as seen at $f\!f$, Figs. 1 and 3, so that the fork may be swayed horizontally in either direction as far as desirable. The fork-handle is also allowed to slide endwise in the roller a certain distance from the ferrule or enlargement $g$ to a movable ring, $d$, by which the extent of this movement of the fork is gaged. The ring $d$ may be secured in position on the fork-handle by means of a set-screw, $i$, Figs. 1 and 3, or by any other convenient means. A stop, $h$, Fig. 1, on the roller G may be employed to hold the fork from being turned too far backward. A cross-handle, $c$, may be attached to the upper end of the fork-handle to enable the attendant to manage the fork with greater care.

The roller and axle may be identical, in which case there should be a frame for securing the shafts to and for the axle to turn in.

The machine thus constructed is drawn steadily along over a row of potatoes by a horse or other animal, while the attendant holding the handle of the fork first causes it to enter the ground beneath the hills of potatoes, and then by pressing down the rear end of the fork-handle quickly the potatoes are thrown out of the ground. He then instantly turns the fork over and clears it of potatoes, dirt, and all obstructions, and repeats the same process with the next hills. The rolling movement of the roller G enables the fork to be inserted into the ground or raised therefrom. The sliding movement of the handle in said roller enables the depth to which the fork may be inserted into the ground to be varied at pleasure, also enhancing the freedom with which the fork may be inserted or withdrawn. The turning movement of the fork-handle in the aperture of the roller allows the fork to be turned over to empty or clear it of whatever may be gathered on the tines, and the flaring mouths of the aperture in the roller permit the fork to be swayed sidewise, so as to reach the potatoes without fail when the implement is not drawn precisely in the right position over the hills. Thus the whole makes a simple and very effective implement for the purpose intended.

What I claim as my invention, and desire to secure by Letters Patent, is—

The arrangement of the fork E within and in combination with the roller G, substantially in the manner and for the purpose herein specified.

MALCOLM LITTLE.

Witnesses:
H. SALSBURY,
JAMES H. PATTEN.